(12) United States Patent
Sumiya et al.

(10) Patent No.: US 7,314,687 B2
(45) Date of Patent: Jan. 1, 2008

(54) GELLING AGENT FOR ALKALINE CELL AND ALKALINE CELL

(75) Inventors: Takashi Sumiya, Kyoto (JP); Takeaki Yamaguchi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 664 days.

(21) Appl. No.: 10/486,030

(22) PCT Filed: Jul. 26, 2002

(86) PCT No.: PCT/JP02/07639

§ 371 (c)(1),
(2), (4) Date: Feb. 6, 2004

(87) PCT Pub. No.: WO03/017399

PCT Pub. Date: Feb. 27, 2003

(65) Prior Publication Data

US 2004/0170900 A1    Sep. 2, 2004

(30) Foreign Application Priority Data

Aug. 9, 2001   (JP) .............................. 2001-241784
Jul. 3, 2002   (JP) .............................. 2002-194060

(51) Int. Cl.
*H01M 6/14*    (2006.01)

(52) U.S. Cl. ...................... 429/303; 429/189; 429/206; 429/207; 252/62.2; 523/513; 523/514

(58) Field of Classification Search ................ 429/303, 429/300, 215, 217, 206, 207, 189; 252/62.2
See application file for complete search history.

(56) References Cited

U.S. PATENT DOCUMENTS 6,265,105 B1    7/2001   Tokuda et al. .............. 429/206
6,667,133 B1   12/2003   Sumiya et al. ............. 429/303

FOREIGN PATENT DOCUMENTS

| JP | 2-119053   | 5/1990  |
| JP | 5-135770   | 6/1993  |
| JP | 2000-67910 | 3/2000  |
| JP | 2000-306589| 11/2000 |

*Primary Examiner*—Laura Weiner
(74) *Attorney, Agent, or Firm*—Baker & Daniels LLP (57) ABSTRACT

A gelatinizer for alkaline batteries, which comprises crosslinked polymer particles comprising, as one or more main constituting monomer units, (meth) acrylic acid and/or an alkali metal salt thereof having an average particle size of 0.1 to 2,000 µm, and a super fine particle form metal oxide having an average particle size of 0.1 to 100 nm; and an alkaline battery using the gelatinizer. The impact resistance of the battery, the discharge characteristic thereof, the lifespan thereof, and others are very good. The present invention can make the time for producing alkaline batteries short, and is useful for producing batteries containing none of materials harmful to the human body, such as benzene.

16 Claims, 1 Drawing Sheet

FIG_1

GELLING AGENT FOR ALKALINE CELL AND ALKALINE CELL

TECHNICAL FIELD

The present invention relates to a gelatinizer for alkaline batteries, and an alkaline battery. More specifically, the present invention relates to a gelatinizer for cathodes of alkaline batteries made mainly of alkaline electrolyte and zinc powder, and an alkaline battery using the gelatinizer.

BACKGROUND ART

Hitherto, a mixture of a high-concentration alkaline electrolyte (a high-concentration potassium hydroxide aqueous solution, in which zinc oxide or the like is dissolved if necessary), and zinc powder and/or zinc alloy powder has been mainly used in cathodes of alkaline batteries. In order to prevent the precipitation or fluidization of the zinc powder and/or the like in the alkaline electrolyte, gelatinizers obtained by crosslinking poly(meth)acrylic acid or salts thereof with a crosslinking agent are used. The gelatinizers are usually classified into two types, one thereof being fine particle form crosslinked poly(meth)acrylic acids obtained by precipitation-polymerization or some other operation of (meth)acrylic acid in an organic solvent such as benzene in the presence of a very small amount of a crosslinking agent such as divinylbenzene, and the other being crosslinked polymers of poly(meth)acrylic acid and/or an alkali metal salt thereof having a relatively large particle size, a typical example of which is an water-absorbing resin. The former are used mainly to improve the viscosity of electrolytes or improve the injection property of batteries (supply the fluidity of electrolytes), and the latter are used mainly to improve the impact resistance of batteries. In many battery makers, the two are used together (Japanese Patent Application Laid-Open (JP-A) Nos. 6-349484 and 7-65818).

However, these gelatinizers have advantageous effects for preventing the precipitation or fluidization of zinc powder, improving the impact resistance of batteries, preventing liquid leakage from batteries and attaining others, but if the amount of the added gelatinizer becomes larger, the gelatinizer causes the internal resistance value of the battery to be raised, so as to result in problems such that the discharge characteristic or the lifespan of the battery is lowered.

SUMMARY OF THE INVENTION

The present inventors made eager investigation in light of the above-mentioned situation. As a result, it has been found out that the discharge characteristic, the lifespan and others of a battery can be improved, with the impact resistance and others of the battery being kept, by adding a super fine particle form additive to the above-mentioned gelatinizer or adding a super fine particle form additive together with the gelatinizer to an alkaline electrolyte. Thus, the present invention has been achieved.

A first object of the present invention is to provide a gelatinizer capable of making the duration of an alkaline battery long while keeping the impact resistance of the battery.

A second object of the present invention is to provide a gelatinizer making it possible to contribute to a reduction in the time for producing an alkaline battery.

A third object of the present invention is to provide a gelatinizer making it possible to produce a battery, which contains none of materials harmful to the human body, such as benzene, at all.

That is, the present invention relates to the following gelatinizers [1] to [7], and alkaline batteries [8] to [9]:

[1] Gelatinizer:
A gelatinizer which comprises crosslinked polymer particles (A) comprising, as one or more main constituting monomer units, (meth)acrylic acid and/or an alkali metal salt thereof having an average particle size of 0.1 to 2,000 µm; and a super fine particle form metal oxide (1) having an average particle size of 0.1 to 100 nm.

[2] Gelatinizer:
The gelatinizer [1] wherein the amount of the (1) is from 0.1 to 50 parts by mass in relative to 100 parts by mass of the (A):

[3] Gelatinizer:
The gelatinizer [1] wherein the average particle size of the (1) is from 0.1 to 50 nm.

[4] Gelatinizer:
The gelatinizer [1] wherein the (1) is one or more metal oxides selected from the group consisting of $TiO_2$, $Bi_2O_3$, $CuO$, $In_2O_3$, $SnO_2$, and $Nb_2O_5$.

[5] Gelatinizer:
The gelatinizer [1] wherein the (A) are crosslinked polymer particles comprising, as one or more main constituting monomer units, (meth)acrylic acid and/or an alkali metal salt thereof using an allyl ether type crosslinking agent and/or a vinyl type crosslinking agent.

[6] Gelatinizer:
The gelatinizer [1] wherein the (A) are made of a particle form crosslinked polymer (a1) having an average particle size of 100 to 2,000 µm and/or a fine particle form crosslinked polymer (a2) having an average particle size of 0.1 to 100 µm.

[7] Gelatinizer:
The gelatinizer [1] wherein the (A) are made of a particle form crosslinked polymer (a1') having an average particle size of 100 to 1,000 µm and/or a fine particle form crosslinked polymer (a2') having an average particle size of 0.1 to 50 µm.

[8] Gelatinizer
The gelatinizer [1] wherein the (A) are crosslinked polymer particles obtained using aqueous solution polymerization. [9] Alkaline Battery:
An alkaline battery wherein crosslinked polymer particles (A) comprising, as one or more main constituting monomer units, (meth)acrylic acid and/or an alkali metal salt thereof having an average particle size of 0.1 to 2,000 µm are used as a gelatinizer for an alkaline electrolyte for a cathode, characterized by comprising a super fine particle form metal oxide (1) having an average particle size of 0.1 to 100 nm in an amount of 0.001 to 5% by mass of the alkaline electrolyte. [10] Alkaline Battery
The alkaline battery, using gelatinizers [2] to [8].

DETAILED DISCLOSURE OF THE INVENTION (Crosslinked Polymer Particles)

In the present invention, crosslinked polymer particles (A), which constitute one of constituting components of a gelatinizer for alkaline batteries, are polymer particles comprising, as one or more main constituting monomer units, (meth)acrylic acid and/or an alkali metal salt thereof. It is necessary that this polymer is stable over a long period even under strong alkalinity of an alkaline electrolyte. The polymer is preferably a polymer crosslinked with a crosslinking agent which is not cut itself or a crosslinking agent wherein crosslinking points are not cut.

Herein, (meth)acrylic acid means acrylic acid or methacrylic acid. A metal salt thereof is a salt obtained by neutralizing acrylic acid or methacrylic acid with an alkali metal such as potassium, sodium, and lithium.

About the neutralization of (meth)acrylic acid with an alkali metal in the present invention, the crosslinked polymer particles (A) may be non-neutralized particles or neutralized particles since the gelatinizer of the present invention is used in an aqueous alkaline solution having a high concentration; however, a part or the whole of (meth)acrylic acid may be neutralized as the need arises in order to improve workability, pulverize the (A) easily or attain others when the (A) are produced.

When (meth)acrylic acid is neutralized, it is advisable that usually an alkali metal hydroxide, such as potassium hydroxide, sodium hydroxide or lithium hydroxide, or an aqueous solution thereof is added to a monomer before polymerization or a polymer after the polymerization and then the components are mixed. The crosslinking agent which is not cut itself or the crosslinking agent wherein crosslinking points are not cut over a long period even under strong alkalinity of an alkaline electrolyte has a poor water-solubility in many cases. Thus, when (meth)acrylic acid is polymerized in the state that the neutralization degree thereof is high, the crosslinking agent is insufficiently dissolved in an aqueous solution of the monomer and separated even if a given amount of the crosslinking agent is added thereto. Consequently, a given uniform crosslinking cannot be performed so that the crosslinked polymer (A) having desired physical properties may not be obtained. It is therefore preferable to set the neutralization degree of (meth)acrylic acid into 0 to 30% by mole, polymerize the (meth)acrylic acid, and subsequently adjust the neutralization degree if necessary by adding, to the polymer, an alkali metal hydroxide.

When the crosslinked polymer particles (A) are produced in the present invention, (meth)acrylic acid and/or an alkali metal salt thereof as one or more monomers is/are polymerized as one or more main constituting monomer units. If necessary, a different monoethylenic unsaturated monomer which can be copolymerized with (meth)acrylic acid (alkali) may be copolymerized therewith. The different monoethylenic unsaturated monomer may be any copolymerizable monomer, and is not particularly limited. Examples thereof include anionic ethylenic unsaturated monomers such as carboxylic acid (salt) group containing monomers such as maleic acid (alkali metal salts), fumaric acid (alkali metal salts) and itaconic acid (alkali), sulfonic acid (salt) group containing monomers such as acrylamide-2-methylpropanesulfonic acid (alkali), sulfoalkyl (meth)acrylate, and styrenesulfonic acid (alkali);

nonionic water-soluble ethylenic unsaturated monomers such as (meth)acrylamide, N-alkyl (having 1 to 3 carbon atoms) substituted (meth)acrylamide [such as N-methylacrylamide and N,N-dimethylacrylamide], N-vinylacetoamide, monohydroxyalkyl (having 1 to 3 carbon atoms) mono(meth)acrylate, polyethylene glycol (polymerization degree: 2 to 100) mono(meth)acrylate, polypropylene glycol (polymerization degree: 2 to 100) mono(meth)acrylate, and methoxypolyethylene glycol (polymerization degree: 2 to 100) mono(meth)acrylate; and other monoethylenic unsaturated monomers such as (meth)alkyl (having 1 to 5 carbon atoms) acrylate, and vinyl acetate. These ethylenic unsaturated monomers may be used alone or in combination of two or more thereof in an amount within a given range.

The amount of the added ethylenic unsaturated monomer other than (meth)acrylic acid and/or alkali metal salt thereof is preferably from 0 to 50% by mass, more preferably from 0 to 30% by mass of (meth)acrylic acid used at the time of polymerization thereof. Hereinafter, "%" represents % by mass unless otherwise specified.

In the present invention, the crosslinking agent which is not cut itself or the crosslinking agent wherein crosslinking points are not cut over a long period even under strong alkalinity of an alkaline electrolyte is preferably a copolymerizable crosslinking agent which has in the molecule thereof no functional group which is easily hydrolyzed under strong alkalinity, such as an ester bond or an amide bond and which does not generate any functional group which is easily hydrolyzed under strong alkalinity even by crosslinking reaction.

Examples of such a copolymerizable crosslinking agent include allyl ether type crosslinking agents such as (b1) crosslinking agents having in the molecule thereof two allyl groups and no hydroxyl groups, typical examples of which are alkylene (having 2 to 5 carbon atoms) glycol diallyl ether and polyethylene glycol diallyl ether (Mw: 100 to 4,000); (b2) crosslinking agents having in the molecule thereof two allyl groups and 1 to 5 hydroxyl groups, typical examples of which are glycerin diallyl ether, trimethylolpropane diallyl ether, pentaerythritol dially ether, and polyglycerin diallyl ether; (b3) crosslinking agents having in the molecule thereof 3 to 10 allyl groups and no hydroxyl group, typical examples of which are trimethylolpropane triallyl ether, glycerin triallyl ether, pentaerythritol tetraallyl ether, and tetraallyloxyethane; and (b4) crosslinking agents having in the molecule thereof 3 to 10 allyl groups and 1 to 5 hydroxyl groups, typical examples of which are pentaerythritol triallyl ether, diglycerin triallyl ether, and polyglycerin (polymerization degree: 3 to 13) polyallyl ether; and (b5) vinyl type crosslinking agents such as divinylbenzene and divinylbenzenesulfonic acid. These crosslinking agents may be used alone or in combination of two or more thereof.

Among these crosslinking agents, the (b4) are preferable. Since the (b4) have in the molecule thereof 1 to 5 hydroxyl groups and 3 to 10 allyl groups, the (b4) have good compatibility with acrylic acid and/or alkali metal salts. Additionally, the (b4) can make up for low copolymerizability peculiar to allyl groups since the number of the allyl groups in the (b4) is large. Consequently, effective crosslinking can be attained. Thus, the (b4) are preferable.

In the present invention, the added amount of the crosslinking agent (b), which depends on the kind of the used crosslinking agent and the average polymerization degree of (meth)acrylic acid, is preferably from 0.01 to 2.0% by mass, more preferably from 0.03 to 1.0% by mass of (meth)acrylic acid (alkali). If the added amount is 0.01% or more by mass, the spinnability of the produced gelatinizer in aqueous alkali solution can be decreased and further the stability of the gelatinizer in aqueous alkali solution is improved so that a fall in the viscosity with the passage of time can be prevented. If the added amount is 2.0% or less by mass, the crosslink density of the crosslinked polymer does not become very high so that the absorption thereof into aqueous alkali solution does not lower. Consequently, the viscosity of the aqueous alkali solution to which the gelatinizer is added does not lower. Thus, the separation of the alkali electrolyte can be prevented.

As described above, in the present invention, the crosslinking agent (b) which is not cut itself or the crosslinking agent (b) wherein crosslinking points are not cut over a long period even under strong alkalinity of an alkaline electrolyte is preferable as the crosslinking agent. When there is used an ester type copolymerizable crosslinking agent used in ordinary water-absorbing resins, such as trimethylolpropane triacrylate, amide type copolymerizable crosslinking agents, a typical example of which is methylenebisacrylamide, or carboxylic acid reactive type crosslinking agents, a typical example of which is ethylene glycol diglycidyl ether, the resultant crosslinked structure decomposes easily under strong alkalinity. Accordingly, effect is hardly produced on decrease in the spinnability under strong alkalinity or improvement in the stability of gel concentration over a long period. However, some effect may be produced on improvement in the dispersibility of the gelatinizer in alkali electrolyte, improvement in the absorption rate thereof in alkali electrolyte, or the like. Thus, a small amount of a different crosslinking agent (c) may be used together with the (b).

Examples of the crosslinking agent (c) include (c1) copolymerizable crosslinking agents having in the molecule thereof 2 to 10 functional groups, typical examples of which are N,N'-methylenebisacrylamide, ethylene glycol di(meth)acrylate, trimethylolpropane di(meth)acrylate, trimethylolpropane tri(meth)acrylate, pentaerythritol di(meth)acrylate, pentaerythritol tri(meth)acrylate, and pentaerythritol tetra(meth)acrylate; and (c2) crosslinking agents reactive with carboxylic acid, typical examples of which include polyhydricglycidyl compounds, a typical example of which is ethylene glycol diglycidyl ether, polyhydric isocyanate compounds, a typical example of which is 4,4'-diphenylmethane diisocyanate, polyhydric amine compounds, a typical example of which is ethylenediamine, and polyhydric alcohol compounds, a typical example of which is glycerin.

In the case that the above-mentioned reactive crosslinking agent (c2) is used, it is common that at any stage after the addition of the crosslinking agent the reaction system is heated preferably at 100 to 230° C., more preferably at 120 to 160° C. to advance the crosslinking reaction. The reactive crosslinking agents (c2) may be alone within the range of given amounts, or may be used in combination of two or more thereof. Furthermore, the agent(s) (c2) may be used together with the above-mentioned copolymerizable crosslinking agent (c1).

The added amount of these different crosslinking agents (c), which are added if necessary, is preferably from 0 to 0.5%, more preferably from 0 to 0.3% by mass of (meth)acrylic acid (alkali).

Examples of the polymerization method for obtaining the crosslinked polymer in the present invention include aqueous solution polymerization, reversed-phase suspension polymerization, (organic) solution polymerization, bulk polymerization, the so-called precipitation polymerization, wherein a difference between the solubility of a monomer and that of the resultant polymer in an organic solvent such as benzene is used to conduct polymerization, and emulsion polymerization, wherein a suitable emulsifier is used to polymerize an aqueous solution of (meth)acrylic acid (alkali metal salt) in an organic solvent.

Among these polymerization methods, aqueous solution polymerization, reversed-phase suspension polymerization and precipitation polymerization are preferable since the molecular weight of the cross-linked polymer is easily raised to improve the viscosity-increasing effect of the gelatinizer easily. Aqueous solution polymerization is more preferable when the following is also taken into consideration: the standpoint that an organic solvent which may produce a bad effect on the human body or environment, such as benzene, is not used.

Thereafter, the crosslinked polymer obtained by the above-mentioned polymerization is subjected to distillation-off/removal of water or organic solvents or to drying if necessary. Furthermore, the resultant is pulverized and the particle size thereof is adjusted into a given particle size if necessary. In this way, crosslinked polymer particles (A) are produced.

The particle size of the crosslinked polymer particles (A) of the present invention is usually adjusted in such a manner that the average particle size of the dried product thereof will be from 0.1 to 2,000 µm, preferably from 0.1 to 1,000 µm. If the particle size is less than 0.1 µm, the production of the particles or the isolation thereof from the solvent or the like is difficult in many cases. On the other hand, if the particle size is more than 2,000 µm, in the cathode container or filling line of an alkaline battery the particles cannot be put into the container or the line may be clogged since the particles are too large. The average particle size in the present invention means mass-average particle size. The mass-average particle size is measured by the method of plotting each particle size distribution of the cross-linked polymer onto a logarithm probability sheet wherein its transverse axis represents the particle size thereof and its vertical axis represents the content thereof on the basis of mass, and then obtaining the particle size at the point where 50% of the mass of the whole is occupied. It is preferable about the particle size of the (A) that the content by percentage of the particles having a size of less than 0.1 µm is 3% or less and the content by percentage of the particles having a size of more than 2,000 µm is 3% or less.

In the case that, in particular, particles having an average particle size of 100 to 2,000 µm (a1) or, in particular, particles having an average particle size of 100 to 1,000 µm (a1'), among the particles having particle sizes within the above-mentioned range, are used as the gelatinizer for alkaline batteries, they produce a particularly good effect on improvement in the impact resistance of the batteries. On the other hand, in particular, particles having an average particle size of 0.1 to 100 µm (a2), more preferably particles having an average particle size of 0.1 to 50 µm (a2'), have a high viscosity but can give fluidity to electrolyte; therefore, they have an excellent effect for improving the injecting property thereof into batteries using a pump or the like.

When the crosslinked polymer particles (A) having a given particle size are produced, pulverization, which is performed if necessary, may be based on an ordinary pulverizing method (for example, an impact crusher, a pin mill, a cutter mill, a Skirel mill, or a ball mill) in the case of the (a1). In the case of the (a2), it is preferable to use a high-speed rotation impact crusher such as an ACM pulverizer, air pulverization (a jet crusher or the like), freezing pulverization, or the like.

Usually, according to precipitation polymerization or emulsion polymerization, particles at a polymerization stage are already fine particles (0.1 to 100 µm) Therefore, if the solvent or the like is distilled off by such a method as spray drying or vacuum evaporation, pulverization or the like may not be newly performed in many cases.

The particle form crosslinked polymers (a1) and (a2) may be used alone or in combination. In order to aim for the above-mentioned two effects, that is, in order to improve the impact resistance of a battery and make a high-speed injection of an electrolyte having an increased viscosity into a battery container easy, using a pump or the like, it is preferable to use the (a1) and the (a2) together, or use the (a1) and the (a2) mixed in advance. The mixing ratio between the (a1) and the (a2) may be arbitrary.

The added amount of the crosslinked polymer particles (A) is preferably from 0.1 to 10% by mass, more preferably from 1 to 5% by mass of a 35-40% solution of potassium hydroxide in water, which is an alkaline electrolyte, as the total amount of the (a1) and the (a2). If the added amount is 0.1% or more by mass, the viscosity-increasing effect of the crosslinked polymer particles (A) is insufficiently exhibited. If the amount is 10% or less by mass, the increased viscosity of the electrolyte is not made very high. Thus, the electrolyte is easy to handle.

(Super Fine Particle form Metal Oxide)

The super fine particle form metal oxide (1) used in the present invention is any super fine particle form metal oxide which has an average particle size of 0.1 to 100 µm and is capable of being added to a gelatinizer or alkaline electrolyte, whereby the viscosity-increasing property of the gelatinizer can be made high. A metal oxide such as $TiO_2$, $Bi_2O_3$, CuO, $In_2O_3$, $SnO_2$ or $Nb_2O_5$ is preferable when the following is also taken into consideration: the standpoint that even under ordinary use conditions for alkaline batteries, that is, even under strong alkalinity of an alkaline electrolyte having a temperature of −10 to 80° C., the oxide (1) is not dissolved over a long period and hydrogen gas is not generated in the cathode container thereof or a rise in the internal resistance value is not caused. $TiO_2$ is practical and particularly preferable when the matter that $TiO_2$ is easily available, costs thereof, and others are also taken into consideration. These metaloxides may be used alone or in combination of two or more thereof.

The impurity content in the super fine particle form metal oxide (1) used in the present invention is preferably as small as possible for the use thereof. In particular, the content of metals which may generate hydrogen gas or some other gas when the metals are incorporated into an alkaline battery cathode material, such as iron, nickel, chromium, molybdenum, lead, antimony and vanadium, is preferably 1% or less by mass, more preferably 0.1% or less by mass.

The particle size of the super fine particle form metal oxide (1) is usually from 0.1 to 100 nm, preferably from 0.1 to 50 nm. If the particle size is more than 100 nm, the viscosity-increasing effect may be insufficient. On the other hand, if the particle size is less than 0.1 nm, the particles are neither easily produced nor easily obtained in many cases. About the shape of the super fine particle form metal oxide (1), no especial limitation is imposed thereon. Examples of the shape include spherical, granular, block and scaly shapes. The average particle size can be measured by an ordinary method, for example, calculation from values obtained by the BET method, Sears method or laser method.

When the (1) is added to the crosslinked polymer particles (A), the added amount thereof is preferably from 0.1 to 50 parts by mass, more preferably from 0.5 to 30 parts by mass in relative to 100 parts by mass of the (A). If the added amount is 0.1 part or more by mass and 50 parts or less by mass, the viscosity-increasing effect of the gelatinizer is sufficient.

The adding method in the case of adding the (1) to the (A) may be performed at any stage when the crosslinked polymer particles (A) are produced if the particle size of the (1) can be maintained. However, if the (1) enters the inside of the (A), the (1) is covered with the (A) so that the particle size cannot be maintained. It is therefore preferable to add the (1) after or when the crosslinked polymer is pulverized into powder and, if necessary, perform blend.

Especial limitation is not imposed on the addition device in the case of the adding the (1) to the (A) if the device makes it possible to add a given amount thereof. When a powder mixer such as a conical blender, a V-shaped mixer, a ribbon blender or a kneader is used, they can easily be mixed.

(Alkaline Battery)

Another of the present invention is an alkaline battery wherein the (A) and the (1) are blended with a cathode material.

Usually, the cathode material of an alkaline battery is composed of 30 to 200 parts of zinc powder or zinc alloy powder having an average particle size of about 10 to 400 µm and about 0.1 to 10 parts of a gelatinizer {crosslinked polymer particles (A)} in relative to 100 parts of an alkaline electrolyte (an aqueous 35-40% solution of potassium hydroxide wherein zinc oxide is dissolved). However, the alkaline battery of the present invention is a battery wherein a given amount of the fine particle form metal oxide (1) is further added thereto. The added amount of the (1), which depends on the added amount of the used (A), is from 0.001 to 5% by mass, preferably from 0.01 to 3% by mass of the alkaline electrolyte. If the added amount is less than 0.001% by mass, the viscosity-increasing effect is insufficient. On the other hand, if the added amount is more than 5% by mass, a bad effect may be produced on the discharge characteristic of the alkaline battery.

The method for adding the (1) in the case of adding the (1) when the cathode material of the alkaline battery is produced may be any method which makes it possible that the cathode material of the alkaline battery can be homogeneously mixed with the (1). Examples thereof include a method of adding the (1) at the same time when an about 35-40% solution of potassium hydroxide in water, which is an alkaline electrolyte, is mixed with zinc powder, zinc oxide and the crosslinked polymer particles (A) so as to produce an alkaline battery cathode material, and then mixing the added components; a method of adding the gelatinizer of the present invention, that is, the (A) to which the (1) is added; a method of blending the (1) beforehand with used zinc powder, and subsequently adding another cathode material thereto; a method of adding the (A) and the (1) to an aqueous potassium hydroxide solution wherein zinc oxide is dissolved, and adding thereto zinc powder.

After the mixing according to the above-mentioned method, the amount of the (1) can be mixed for further adjustment.

The thus-produced alkaline battery can be preferably used as a primary battery for toys, portable CD players, portable MD players, electrical appliances for which a good impact resistance or discharge characteristic is required, and portable household electrical appliances.

BEST MODE FOR CARRYING OUT THE INVENTION

Hereinafter, the present invention is further described by way of the following examples and comparative examples. However, the present invention is limited thereto. As crosslinked polymers used in the examples and comparative examples, crosslinked polymers-1 to 3 were produced or obtained by the following methods.

(Synthesis of a Crosslinked Polymer-1)

Into a 2 L beaker were put 200 g of acrylic acid, 0.4 g (0.2% by mass of acrylic acid) of pentaerythritol triallyl ether (manufactured by Daiso Co., Ltd.), and 800 g of ion exchange water, and then the resultant was cooled to 8° C.

This aqueous acrylic acid solution was put into a 1.5 L heat-insulated polymerizing tank, and nitrogen was caused to flow in the aqueous solution so as to set the amount of oxygen dissolved in the aqueous solution into 0.1 ppm or less. Thereto were added 4.0 g of 0.1% hydrogen peroxide water, 4.0 g of a 0.1% solution of L-ascorbic acid in water, and 1.0 g of a 10% solution of 2,2'-azobis(2-amidinopropane) hydrochloride (trade name: V-50, manufactured by Wako Pure Chemicals, Industries) in water. Nitrogen purge into the aqueous solution was continued till the start of polymerization. Since the polymerization started so that the viscosity of the aqueous acrylic acid solution started to rise, the nitrogen purge was stopped and the polymerization was continued for 6 hours. The temperature of the aqueous acrylic acid solution was measured with a dotting thermometer. As a result, the highest arrival temperature was 63° C.

A crosslinked hydrated gel in a block form was taken out from the heat-insulated polymerizing tank, and a small-sized meat chopper (manufactured by Loyal Co.) was used to subdivide the gel into a size of 3 to 10 mm. Thereafter, thereto was added 139 g of a 40% solution (neutralization degree: 50% by mol) of sodium hydroxide (extra pure reagent) in water, so as to neutralize the hydrated gel.

The neutralized hydrated gel was laminated into a thickness of 5 cm on a screen made of SUS and having a sieve opening of 850 μm size. A small-sized air-infiltrating drier (manufactured by Inoue Kinzoku Co.) was used to infiltrate hot wind of 120° C. temperature into the hydrated gel for one hour to dry the hydrated gel.

A cooking mixer was used to pulverize the dried product, and a sieve was used to collect particles having particle sizes of 210 to 850 μm (average particle size: 400 μm). In this way, a crosslinked polymer-1 was obtained.

(Synthesis of a Crosslinked Polymer-2)

A jet mill crusher (manufactured by Nippon Pneumatic Mfg. Co., Ltd.) was used to subject the crosslinked polymer-1, which was obtained as described above, to pulverization and classification. In this way, a crosslinked polymer-2 having an average particle size of 15 μm was obtained.

(Synthesis of a Crosslinked Polymer-3)

A commercially available JUNLON PW-150 (crosslinked polyacrylic acid fine particles, a product obtained by precipitation polymer in benzene, average particle size of 1 μm, crosslinking agent: divinylbenzene, manufactured by Nihon Junyaku Co., Ltd.) per se was used as a crosslinked polymer-3.

A liquid chromatography having an UV detector (extracting solvent: hexane, measuring wavelength: 320 nm) was used to measure the amount of benzene remaining in this crosslinked polymer-3. As a result, the remaining amount of benzene was 15,100 ppm.

EXAMPLES 1 TO 3

Into a vinyl polymer bag were put 100 g of each of the crosslinked polymers-1 to 3 and 5 g of highly-pure titanium oxide having an average particle size of 21 nm (trade name: P-25, manufactured by Nippon Aerosil Co., Ltd.). The vinyl plastic bags were then vibrated by hand for about 3 minutes, so as to yield gelatinizers (1) to (3) of the present invention.

EXAMPLES 4 TO 6

Into a vinyl polymer bag were put 100 g of each of the crosslinked polymers-1 to 3 and 10 g of indium oxide having an average particle size of 27 nm (trade name: Nanotec $In_2O_3$, manufactured by C. I. Kasei. Co., Ltd.). The vinyl plastic bags were then vibrated by hand for about 2 minutes, so as to yield gelatinizers (4) to (6) of the present invention.

EXAMPLE 7

Into a vinyl polymer bag were put 50 g of the crosslinked polymer-1, 50 g of the crosslinked polymer-2, and 5 g of titanium oxide used in Example 1 (P-25). The vinyl plastic bag was then vibrated by hand for about 3 minutes, so as to yield a gelatinizer (7) of the present invention.

COMPARATIVE EXAMPLES 1 TO 3

The crosslinked polymers-1 to 3 were used, as they were, as comparative gelatinizers (a) to (c).

The gelatinizers (1) to (7) of the present invention and the comparative gelatinizers (a) to (c) were used to measure the viscosity thereof in a 40% solution of potassium hydroxide in water and the added amount thereof for adjusting the viscosity of a cathode composition by the following methods. The results are shown in Table 1.

(I) Viscosity in a 40% by Mass Solution of Potassium Hydroxide in Water

Into a 250 ml transparent polymer container with a lid was put 200 g of a 40% by mass solution of potassium hydroxide in water, wherein 3% zinc oxide was dissolved. To this solution was added each of a 1.5% by mass gelatinizer, a 2.0% by mass gelatinizer, and a 2.5% by mass gelatinizer. The polymer container was tightly closed up, and then the whole of the container was vigorously shaken for about one minute. This container, in which the aqueous potassium hydroxide solution was put, was allowed to stand still in a thermostat of 25° C. temperature for one hour. Thereafter, a digital B type viscometer (manufactured by TOKIMEC Co.) was used to measure the viscosity of the content therein. Before the measurement, a Teflon rod was used to stir the content uniformly. The resultant value was defined as the viscosity after one hour.

(Measurement Temperature: 40° C., Rotor No. 4, Rotation Number: 3 rpm)

The sample the viscosity measurement of which was finished was again kept airtight. The sample was again put into the thermostat of 25° C. temperature and was allowed to stand still in the state that the sample was kept airtight for 24 hours. Thereafter, the digital B type viscometer was used to measure the viscosity of the content under the same conditions. The resultant value was defined as the viscosity after one day.

(II) Necessary Addition Amount of the Gelatinizer

There were added 500 g of a 40% by mass solution of potassium hydroxide in water, wherein 3% by mass zinc oxide was dissolved, and 300 g of zinc powder. The gelatinizer was added thereto until the viscosity after one day came up to 200 Pa·s (25° C., 3 rpm, Rotor No. 4). The added amount thereof was defined as the necessary addition amount of the gelatinizer.

EXAMPLE 8

The crosslinked polymer-2 was used as a gelatinizer, and the viscosity and the necessary addition amount thereof were measured according to the above-mentioned methods (I) and (II) except that when the viscosity and the necessary addition amount were measured by the methods (I) and (II), 0.1% by mass titanium oxide (P-25) was separately added to the 40% by mass solution of potassium hydroxide in water. The results are shown in Table 1.

The necessary addition amounts of the gelatinizers (1) to (7) of the present invention, the comparative gelatinizers (a) to (c) and the gelatinizer obtained by the method of Example 8 were used to fabricate model batteries by the following method. The internal resistance values of the batteries, the durations of the batteries, and the impact resistance of the batteries were measured by the following methods. The results are shown in Table 2.

(Fabrication of Each Model Battery)

To a kneader having an inner volume of 1 L (inner package: treatment with Teflon) were added 500 g of a 40% by mass solution of potassium hydroxide in water, wherein 3% by mass zinc oxide was dissolved, and the necessary addition amount of each of the gelatinizers, the amount being obtained as described above (in Example 8, 0.1% by mass titanium oxide was separately added to the 40% by mass solution of potassium hydroxide in water). The components were then sufficiently mixed for 60 minutes. Thereafter, the resultant was allowed to stand still for 24 hours to prepare a gelatinized zinc electrolyte.

Figure 1:
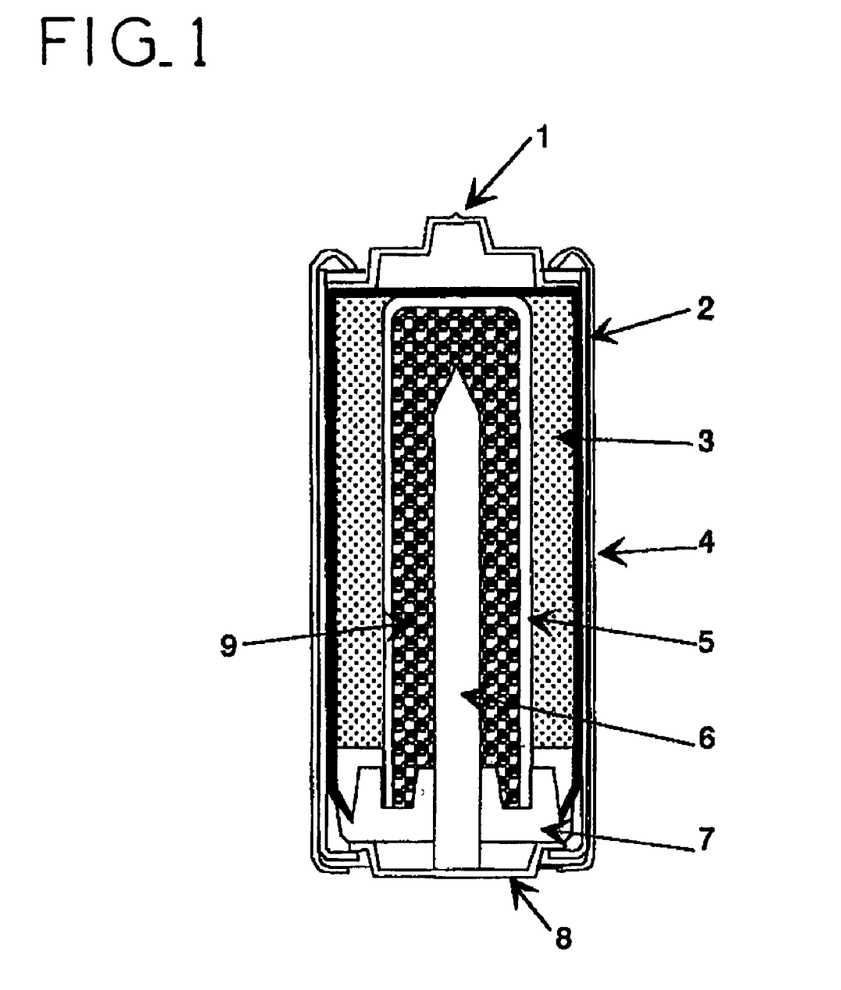
FIG. 1 is a sectional view illustrating an example of the alkaline battery of the present invention.

The gelatinized zinc electrolyte was degassed under reduced pressure. Subsequently, this zinc electrolyte was used, and 15 g thereof was injected into a cathode container of a LR-20 type model battery illustrated in FIG. 1. In this way, a model battery was fabricated.

(III) Internal Resistance Value of the Battery

A resistance measuring instrument was used to measure the internal resistance value (Ω·cm) of the fabricated model battery at room temperature (20 to 25° C.).

(IV) Duration of the Battery

An external resistance having a resistance value of 2 Ω at room temperature (20 to 25° C.) was connected to the fabricated model battery, and then the battery was continuously discharged. The time till the voltage was reduced to 0.9 V was defined as the duration (hr.) of the battery.

(V) Impact Resistance of the Battery

An external resistance having a resistance value of 2 Ω at room temperature (20 to 25° C.) was connected to a model battery fabricated in the same way as described above. While the battery was continuously discharged, the model battery was repeatedly dropped 10 times from a height of 1 m. The voltage before the drop and the voltage just after the drop were measured, and then the impact resistance (%) was calculated from the following equation:

Impact resistance (%)=Voltage (V) just after the (tenth) drop/Voltage (V) before the drop×100

TABLE 1

| | | viscosity of 40% solution of KOH in water (Pa · s) | | | | | | Necessary addition amount (%) for causing viscosity after one day to come up to 200 Pa · s |
|---|---|---|---|---|---|---|---|---|
| | | After 1 hour | | | After 1 day | | | |
| | Kind of gelatinizer | Amount of gelatinizer | | | | | | |
| | | 1.5% | 2.0% | 2.5% | 1.5% | 2.0% | 2.5% | |
| Example 1 | Crosslinked polymer-1 + TiO$_2$ | 25 | 100 | 200< | 30 | 110 | 200< | 2.3 |
| Example 2 | Crosslinked polymer-2 + TiO$_2$ | 27 | 100 | 200< | 30 | 110 | 200< | 2.3 |
| Example 3 | Crosslinked polymer-3 + TiO$_2$ | 170 | 200< | 200< | 185 | 200< | 200< | 1.7 |
| Example 4 | Crosslinked polymer-1 + In$_2$O$_3$ | 20 | 80 | 200< | 30 | 110 | 200< | 2.4 |
| Example 5 | Crosslinked polymer-2 + In$_2$O$_3$ | 18 | 70 | 200< | 30 | 110 | 200< | 2.4 |
| Example 6 | Crosslinked polymer-3 + In$_2$O$_3$ | 160 | 200< | 200< | 185 | 200< | 200< | 1.8 |
| Example 7 | Crosslinked polymer-1 Crosslinked polymer- 2 + TiO$_2$ | 30 | 110 | 200< | 35 | 115 | 200< | 2.2 |
| Example 8 | Crosslinked polymer-2 + TiO$_2$ (separately added) | Poorly dispersed | Poorly dispersed | Poorly dispersed | 28 | 108 | 200< | 2.3 |
| Comparative example 1 | Crosslinked polymer-1 | 0.5 | 3 | 20 | 0.8 | 4 | 30 | 3.1 |
| Comparative example 2 | Crosslinked polymer-2 | Poorly dispersed | Poorly dispersed | Poorly dispersed | 0.7 | 3 | 25 | 3.3 |

TABLE 1-continued

| | | viscosity of 40% solution of KOH in water (Pa · s) | | | | | | Necessary addition amount (%) |
|---|---|---|---|---|---|---|---|---|
| | | After 1 hour | | | After 1 day | | | for causing viscosity after one day to |
| | Kind of | Amount of gelatinizer | | | | | | |
| | gelatinizer | 1.5% | 2.0% | 2.5% | 1.5% | 2.0% | 2.5% | come up to 200 Pa · s |
| Comparative example 3 | Crosslinked polymer-3 | Poorly dispersed | Poorly dispersed | Poorly dispersed | 30 | 110 | 180 | 2.7 |

TABLE 2

| | Gelatinizer | Added amount of gelatinizer (%) | Internal resistance value (Ω · cm) | Duration (hrs) | Impact resistance (%) |
|---|---|---|---|---|---|
| Example 1 | Cross-linked polymer 1 + $TiO_2$ | 2.3 | 0.068 | 16.8 | 98 |
| Example 2 | Cross-linked polymer-2 + $TiO_2$ | 2.3 | 0.069 | 17.0 | 60 |
| Example 3 | Cross-linked polymer-3 + $TiO_2$ | 1.7 | 0.061 | 17.8 | 62 |
| Example 4 | Cross-linked polymer-1 + $In_2O_3$ | 2.4 | 0.070 | 16.7 | 97 |
| Example 5 | Cross-linked polymer-2 + $In_2O_3$ | 2.4 | 0.070 | 16.5 | 61 |
| Example 6 | Cross-linked polymer-3 + $In_2O_3$ | 1.8 | 0.063 | 17.6 | 42 |
| Example 7 | Cross-linked polymer-1 Cross-linked polymer-2 + $TiO_2$ | 2.2 | 0.067 | 17.1 | 96 |
| Example 8 | Cross-linked polymer-2 + $TiO_2$ (separataly added) | 2.3 | 0.069 | 17.0 | 61 |
| Comparative example 1 | Cross-linked polymer-1 | 3.1 | 0.082 | 15.0 | 96 |
| Comparative example 2 | Cross-linked polymer-2 | 3.3 | 0.085 | 14.8 | 58 |
| Comparative example 3 | Cross-linked polymer-3 | 2.7 | 0.072 | 15.9 | 50 |

INDUSTRIAL APPLICABILITY

The gelatinizer or the alkaline battery of the present invention produces advantageous effects as described below.

(i) The addition of a given amount of a super fine particle form metal oxide in the production of a gelatinizer or an alkaline batter makes it possible to raise the viscosity-increasing effect of the gelatinizer largely. Accordingly, the necessary addition amount of the gelatinizer, which is a cause for raising the internal resistance value of the alkaline battery so as to lower the duration of the battery, can be drastically reduced. Therefore, the duration of the battery can be raised while the impact resistance of the battery is maintained.

(ii) The addition of the fine particle form metal oxide to a gelatinizer causes an improvement in the dispersibility of the gelatinizer in an alkaline electrolyte. Therefore, the viscosity of the electrolyte can be increased in a short time. The improvement contributes to a reduction in the time for producing a battery.

(iii) In the case that an aqueous-solution-polymerized product is used as a gelatinizer, difference in viscosity-increasing effect, which is a problem of conventional aqueous-solution-polymerized products, can be overcome as compared with a product precipitation-polymerized in benzene. Accordingly, a battery containing none of materials harmful to the human body, such as benzene, can be fabricated.

Since the above-mentioned advantageous effects are produced, the gelatinizer of the present invention is useful as a gelatinizer for primary and secondary alkaline batteries, such as alkaline button batteries, silver oxide batteries, nickel cadmium storage batteries, and nickel hydrogen storage batteries as well as cylindrical alkaline batteries.

The explanation of reference numbers is as follows.
1. anode terminal plate
2. shrinkage tube
3. anode agent ($MnO_2$+C)
4. exterior can
5. separator
6. power collecting rod
7. gasket
8. cathode terminal plate
9. gel cathode

The invention claimed is:

1. A gelatinizer for alkaline batteries, which comprises crosslinked polymer particles comprising, as one or more main constituting monomer units, (meth) acrylic acid and/or an alkali metal salt thereof having an average particle size of 0.1 to 2,000 μm; and a super fine particle form metal oxide having an average particle size of 0.1 to 100 nm.

2. The gelatinizer for alkaline batteries according to claim 1, wherein the amount of the super fine particle form metal oxide is from 0.1 to 50 parts by mass in relative to 100 parts by mass of the crosslinked polymer particles.

3. The gelatinizer for alkaline batteries according to claim 1, wherein the average particle size of the super fine particle form metal oxide is from 0.1 to 50 nm.

4. The gelatinizer for alkaline batteries according to claim 1, wherein the super fine particle form metal oxide is one or more metal oxides selected from the group consisting of $TiO_2$, $Bi_2O_3$, CuO, $In_2O_3$, $SnO_2$, and $Nb_2O_5$.

5. The gelatinizer for alkaline batteries according to claim 1, the crosslinked polymer particles comprising, as one or more main constituting monomer units, (meth) acrylic acid and/or an alkali metal salt thereof using an allyl ether type crosslinking agent and/or a vinyl type crosslinking agent.

6. The gelatinizer for alkaline batteries according to claim 1, wherein the crosslinked polymer particles are made of a particle form crosslinked polymer having an average particle size of 100 to 2,000 μm and/or a fine particle form crosslinked polymer having an average particle size of 0.1 to 100 μm.

7. The gelatinizer for alkaline batteries according to claim 1, wherein the crosslinked polymer particles are made of a particle form crosslinked polymer having an average particle size of 100 to 1,000 μm and/or a fine particle form crosslinked polymer having an average particle size of 0.1 to 50 μm.

8. The gelatinizer for alkaline batteries according to claim 1, wherein the crosslinked polymer particles are obtained using aqueous solution polymerization.

9. An alkaline battery including an alkaline electrolyte for a cathode of the battery, the electrolyte having a gelatinizer comprising crosslinked polymer particles including, as one or more main constituting monomer units, (meth) acrylic acid and/or an alkali metal salt thereof having an average particle size of 0.1 to 2,000 μm and further including a super fine particle form metal oxide having an average particle size of 0.1 to 100 nm in an amount of 0.001 to 5% by mass of the alkaline electrolyte.

10. The alkaline battery according to claim 9, wherein the amount of the super fine particle form metal oxide is from 0.1 to 50 parts by mass relative to 100 parts by mass of the crosslinked polymer particles.

11. The alkaline battery according to claim 9, wherein the average particle size of the super fine particle form metal oxide is from 0.1 to 50 nm.

12. The alkaline battery according to claim 9, wherein the super fine particle form metal oxide is one or more metal oxides selected from the group consisting of $TiO_2$, $Bi_2O_3$, CuO, $In_2O_3$, $SnO_2$, and $Nb_2O_5$.

13. The alkaline battery according to claim 9, the crosslinked polymer particles comprising, as one or more main constituting monomer units, (meth) acrylic acid and/or an alkali metal salt thereof using an allyl ether type crosslinking agent and/or a vinyl type crosslinking agent.

14. The alkaline battery according to claim 9, wherein the crosslinked polymer particles are made of a particle form crosslinked polymer having an average particle size of 100 to 2,000 μm and/or a fine particle form crosslinked polymer having an average particle size of 0.1 to 100 μm.

15. The alkaline battery according to claim 9, wherein the crosslinked polymer particles are made of a particle form crosslinked polymer having an average particle size of 100 to 1,000 μm and/or a fine particle form crosslinked polymer having an average particle size of 0.1 to 50 μm.

16. The alkaline battery according to claim 9, wherein the crosslinked polymer particles are obtained using aqueous solution polymerization.

* * * * *

UNITED STATES PATENT AND TRADEMARK OFFICE
CERTIFICATE OF CORRECTION

PATENT NO. : 7,314,687 B2
APPLICATION NO. : 10/486030
DATED : January 1, 2008
INVENTOR(S) : Takashi Sumiya et al.

It is certified that error appears in the above-identified patent and that said Letters Patent is hereby corrected as shown below:

Claim 1, Column 14, Line 54, delete "of0.1" and insert --of 0.1--

Signed and Sealed this

Sixth Day of May, 2008

JON W. DUDAS
*Director of the United States Patent and Trademark Office*